Patented Aug. 21, 1928.

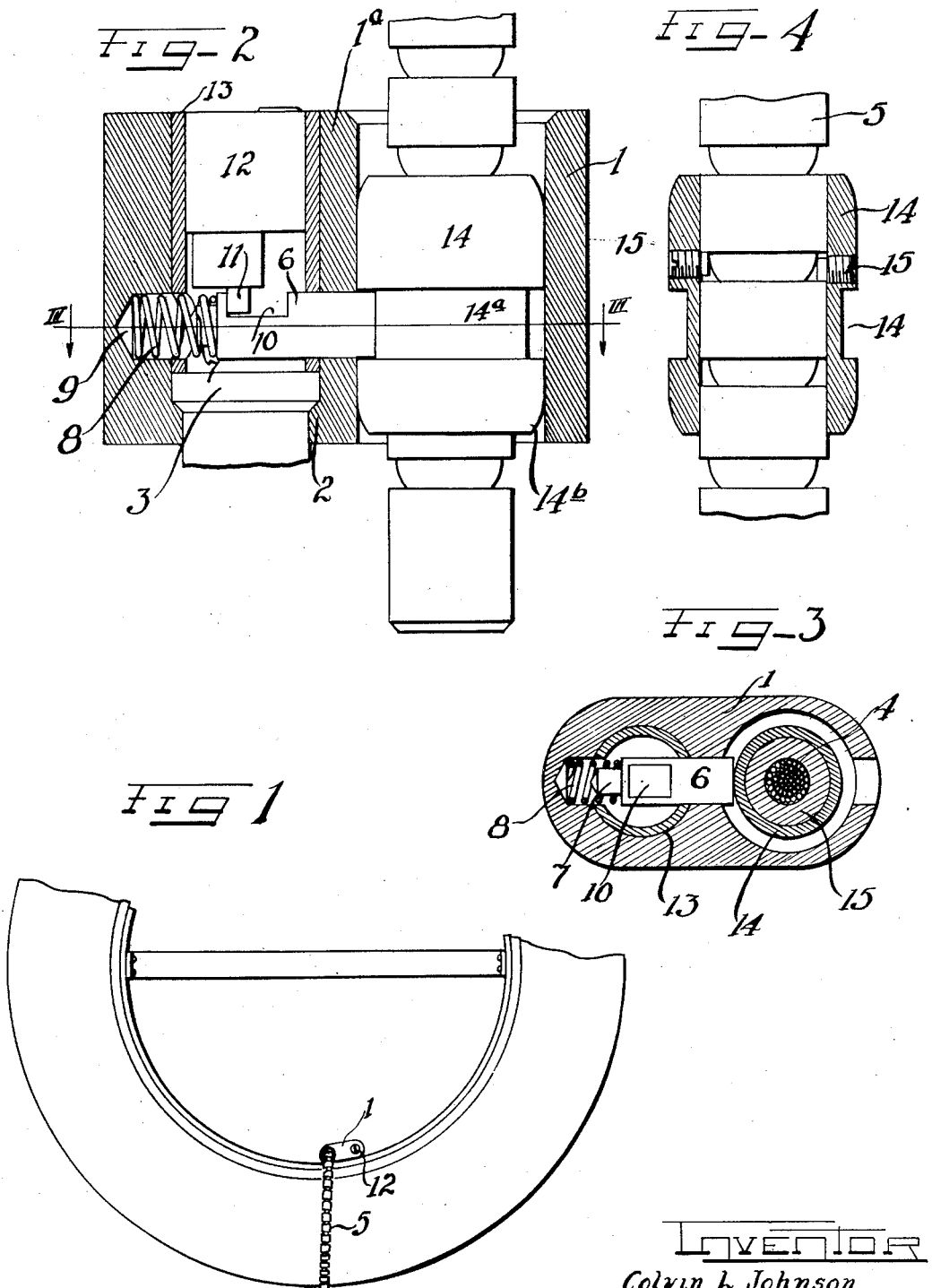

1,681,409

UNITED STATES PATENT OFFICE.

COLVIN L. JOHNSON, OF ST. LOUIS, MISSOURI, ASSIGNOR TO JOHNSON AUTOMOBILE LOCK CO., OF ST. LOUIS, MISSOURI, A CORPORATION OF MISSOURI.

SPARE-TIRE LOCK.

Application filed January 31, 1927. Serial No. 164,890.

This invention relates to a spare tire lock and particularly to that type of spare tire lock wherein an armor cable is lockingly engaged around the spare tire and rim and some fixed part of the automobile body or chassis.

Difficulty has heretofore been experienced with spare tire locks of this general type in that they have been somewhat difficult to lock and unlock and in that too much slack has been present in the armoring means.

It is an important object therefore of the present invention to provide a spare tire lock of the armored cable type which is conveniently adjustable to various size tires, which locks automatically, which may be easily unlocked and which embodies means for taking up undesirable slack in the cable armor.

It is also an important object of this invention to provide a spare tire lock of the class described which is neat in appearance and which may be economically manufactured.

Other and further important objects of this invention will be apparent from the disclosures in the specification and the accompanying drawings.

The invention (in a preferred form) is illustrated in the drawings and hereinafter more fully described.

On the drawings:

Figure 1 is a fragmentary elevational view showing a spare tire and mounting therefor provided with the improved locking mechanism of this invention.

Figure 2 is an enlarged fragmentary section on the line II—II of Figure 1 with parts in elevation.

Figure 3 is a slightly reduced section on the line III—III of Figure 2 with parts in elevation.

Figure 4 is an enlarged fragmentary section with parts in elevation taken through the adjustable locking spool and showing the means whereby slack in the cable armor is taken up.

As shown on the drawings:

The reference numeral 1 indicates a lock block or casing which is constructed of hardened metal and which is provided with two parallel longitudinal passages extending therethrough for a purpose to be described hereinafter. In one of these passages, the left-hand passage as shown in Figures 2 and 3, an integral shoulder 2 is formed at one end, this shoulder affording a seat for a flange 3 permanently secured to the end of the armor cable comprising an interior stranded member 4 and a plurality of interengaging hardened separate armor members 5. The construction of an armored cable of the type which I propose employing in the present invention is described in United States Letters Patent No. 1,394,259, granted to me October 18th, 1921.

The portion $1^a$ of the casing 1 between the aforementioned passages provided in said casing is provided with a lateral passage which slidably receives a lock bolt 6, the free end of which is adapted to normally project into the right-hand passage in Figures 2 and 3 for a purpose to be described hereinafter. The other end of the lock bolt 6 is reduced as shown at 7 and engaged around said reduced portion 7 and against the shoulder on the lock bolt 6 formed thereby is a helical spring 8, one end of which extends into and abuts against the inner end of a recess 9 formed in the casing 1 and communicating with that passage in which the flange 3 is anchored. The upper face of the lock bolt 6 is provided with a cut-away or recessed portion 10 into which projects an eccentric member 11 secured to the inner end of a lock cylinder 12 which is of usual construction and which is rotatably mounted in the end of the passage opposite the flange 3. In order to properly mount said lock cylinder in the passage provided, a sleeve 13 which is permanently secured in the passage and which is provided at one end with lateral openings through which the bolt 6 and the spring 8 extend, is provided. Said lock cylinder 12 is, of course, key-operated in the usual manner and it will be evident that rotation thereof will cause the eccentric 11 to engage the bolt 6 at one end of the cut-away portion 10 and force said bolt to the left in Figures 2 and 3 against the action of the spring 8 normally urging the same to the right in said figures. The free end of the armor cable, after being engaged around the tire and rim and tire carrier or other fixed part of the automobile body or chassis, is adapted to be passed through the right-hand passage in the casing 1 as shown in Figures 2 and 3 and adjustably locked from movement relative to the casing by the locking bolt 6 in the manner which will now be described.

Adjustably secured to the armored cable is an externally grooved spool or bushing 14 which is of generally cylindrical form and provided with an external groove 14ª intermediate its ends for reception of the end of the locking bolt 6. Said spool or bushing 14 is adjustably secured to the cable armor by set screws 15 which engage through lateral threaded apertures therein and the inner ends of which engage the spherical portions of adjacent sections of the armor 5. These set screws 15 as will be noted from Figure 4 are longitudinally offset so that they may be forced in between the sections of the armor 5 to force two of the sections inside the spool or bushing apart and thus take up any undesirable slack which may exist in the sectional armor. In view of the fact that these set screws are positioned within the passage of the casing 1 and inaccessible when the spool 14 is locked in the passage by the engagement of the bolts 6 in the groove 14ª, it will be evident that adjustment and taking up of slack may be effected when the device is unlocked without imparing the effectiveness thereof as a locking device. As will be apparent, the spool or bushing 14 may be adjusted to any desired position longitudinally of the cable armor to accommodate the device to different sized tire casings and securing means therefor.

When it is desired to lock a tire and rim in position, it is only necessary to engage the armor cable therearound and insert the free end thereof through the open passage in the casing 1 until the rounded end 14ᵇ of the spool 14 forces the locking bolt 6 out of said recesses and permits the spool 14 to be further moved into the recess until the groove 14ª is in register with said locking bolt at which time the locking bolt will be forced in said groove by the action of the spring 8. Thus no key is required in the locking operation.

When it is desired to unlock the device, a key is inserted in the lock cylinder 12 and the cylinder is rotated until the eccentric 11 retracts the locking bolt 6 from the groove 14ª whereupon the end of the armor cable and the spool 14 thereon may be withdrawn from the passage in the casing or block 1.

It will thus be evident that I have provided a construction which is simple and neat in appearance which may be adjusted to various sized tire casings and mounting attachments therefor and which may be conveniently locked therearound without the necessity of using a key in the locking operation. Furthermore, this invention provides means for taking up undesirable slack in the sectional cable armor and the spool 14 is also adjustable to accommodate various sized installations.

I am aware that numerous details of construction may be varied through a wide range without departing from the principles of this invention, and I therefore do not purpose limiting the patent granted, otherwise than necessitated by the prior art.

I claim as my invention:

1. In a spare tire lock, a casing having two passages therethrough, an armored cable anchored at one end in one of said passages, a bolt slidably mounted in the casing extending across said last mentioned passage with its end normally projecting into the other passage, a lock cylinder in the passage in which the end of the cable is anchored for withdrawing the end of the bolt from said other passage, and a grooved spool secured to the cable and adapted to be locked in said other passage by said bolt.

2. In a spare tire lock, a casing having two passages therein, an armored cable anchored at one end in one of said passages, a bolt slidably mounted in the casing with its end normally projecting into the other passage, lock mechanism in the passage in which the end of the cable is anchored for withdrawing the end of the bolt from said other passage, and means adjustably secured to the cable for taking up the slack in said cable and adapted to be locked in said other passage by said bolt.

3. In a spare tire lock, a casing having two passages therethrough, an anchored cable anchored at one end in one of said passages, a bolt slidably mounted in the casing extending across said last mentioned passage with its ends normally projecting into the other passage, a lock cylinder in the passage in which the end of the cable is anchored for withdrawing the end of the bolt from said other passage, and means adjustably secured to the cable anchor and adapted to be locked in said other passage by said bolt.

4. In a device of the kind described, a casing having two passages therethrough, a lock mechanism including a bolt and a cylinder for retracting the same mounted in one of said passages, a cable having one end anchored in said last mentioned passage, and a grooved spool secured to the cable intermediate its ends and adapted to be engaged through the other passage and locked therein by said bolt.

5. In a device of the kind described, a casing having a passage therein, a lock mechanism including a bolt and a cylinder for retracting the same mounted in said casing, a cable having one end anchored in said casing, and a round end sleeve secured to the cable and adapted to be positioned in the casing between the ends of the passage and locked therein by said bolt.

6. In a device of the kind described, a casing having two passages therethrough, one of said passages being reduced at one end whereby the casing forms a shoulder therein, an armored cable anchored at one end in said passage against said shoulder, a lock cylinder secured in the other end of said passage, a transverse spring-pressed bolt slidably engaged in said casing between the end of the cable and the cylinder, means operated by the cylinder for retracting said bolt, and means on the armored cable adapted to be positioned in the other passage for engagement by said bolt.

7. In a device of the kind described, a casing having two passages therethrough, one of said passages being reduced at one end whereby the casing forms a shoulder therein, a cable anchored at one end in said passage against said shoulder, a lock cylinder secured in the other end of said passage, a transverse spring-pressed bolt slidably engaged in said casing between the end of the cable and the cylinder, means operated by the cylinder for retracting said bolt, and a grooved spool adjustably secured to the cable and adapted to be positioned in the other passage for engagement by said bolt.

8. In a device of the kind described, a casing, a lock bolt movably mounted therein, a passage through the casing into which said lock bolt projects, a cable secured at one end to the casing, a sectional armor on the cable, means secured to the cable adapted to be locked in said passage by said bolt, and means associated with said last mentioned means for engagement between the sections of the cable armor to take up slack therein.

9. In a device of the kind described, a casing, a lock bolt movably mounted therein, a passage through the casing into which said lock bolt projects, a cable secured at one end to the casing, a sectional armor on the cable, means secured to the cable adapted to be locked in said passage by said bolt, and threaded means associated with said last-mentioned means for engagement between the sections of the cable armor to take up slack therein.

10. The combination with a passaged casing having a lock mechanism therein, of a cable anchored at one end to the casing and adapted to be locked in the passage in the casing by the lock mechanism at a point intermediate its ends, a sectional armor on the cable, and means disposed in said passage when the device is locked for taking up the slack between the sections of said armor.

11. In a device of the class described, a casing, a lock mechanism associated therewith, a cable covered by sectional armor connected at one end to said casing and having an intermediate portion disposed in cooperative relation with said lock mechanism, and means associated with said intermediate portion for taking up the slack between the sections of said armor.

12. In a device of the class described, a casing, a lock mechanism associated therewith, a cable covered by sectional armor connected at one end to said casing and having an intermediate portion disposed in cooperative relation with said lock mechanism, and means associated with said intermediate portion for taking up the slack between the sections of said armor, said latter means including a sleeve telescoped by said armored cable and adapted to be engaged by said lock mechanism.

In testimony whereof I have hereunto subscribed my name at St. Louis, Missouri.

COLVIN L. JOHNSON.